United States Patent [19]

Anolick et al.

[11] 4,021,600
[45] * May 3, 1977

[54] SLURRY POLYMERIZATION PROCESS

[75] Inventors: Colin Anolick; Robert Allen Covington, Jr., both of Wilmington, Del.

[73] Assignee: E. I. Du Pont de Nemours and Company, Wilmington, Del.

[*] Notice: The portion of the term of this patent subsequent to Apr. 2, 1991, has been disclaimed.

[22] Filed: June 9, 1975

[21] Appl. No.: 585,352

Related U.S. Application Data

[63] Continuation-in-part of Ser. No. 241,234, April 5, 1972, abandoned, which is a continuation-in-part of Ser. No. 873,354, Nov. 3, 1969, abandoned.

[52] U.S. Cl. ........................... 528/484; 23/285; 526/88
[51] Int. Cl.² ............... C08F 2/14; C08F 210/18
[58] Field of Search ...... 260/88.2 R, 80.78, 94.9 P; 526/88; 528/484

[56] References Cited

UNITED STATES PATENTS

| | | | |
|---|---|---|---|
| 2,944,047 | 7/1960 | Schutz | 260/88.2 |
| 3,113,843 | 12/1963 | Li | 23/285 |
| 3,156,677 | 11/1964 | Resnick | 260/88.2 |
| 3,203,766 | 8/1965 | Mudd et al. | 260/94.9 P |
| 3,291,780 | 12/1966 | Cladding | 260/80.78 |
| 3,468,868 | 9/1969 | Manvil | 260/94.9 |
| 3,508,882 | 4/1970 | Farnell | 260/95 R |
| 3,520,859 | 7/1970 | Schrage et al. | 260/80.78 |
| 3,681,308 | 8/1972 | Irvin et al. | 260/94.9 P |
| 3,723,348 | 3/1973 | Apotheker et al. | 260/80.78 |
| 3,801,286 | 4/1974 | Anolick et al. | 260/80.78 |

FOREIGN PATENTS OR APPLICATIONS 1,321,709  6/1973  United Kingdom

*Primary Examiner* — Edward J. Smith

[57] ABSTRACT

An improvement in a process for the copolymerization of ethylene and an $\alpha$-olefin having 3 to 18 carbon atoms and optionally also a nonconjugated diene having only one readily polymerizable double bond in the presence of a catalyst and a liquid organic medium to an elastomeric copolymer insoluble in the liquid polymerization medium, having a portion of said medium occluded therein, and tending to agglomerate on solid surfaces, wherein simultaneously and continuously a. the agglomerated copolymer adhering to the interior surfaces of the polymerization vessel is removed with a wall scraper which is being cleaned by a cleaning member associated therewith;
b. the agglomerated copolymer is collected; and
c. the collected agglomerated copolymer is concurrently sheared and extruded, whereby the occluded liquid polymerization medium is separated from the copolymer and remains in the polymerization vessel, while the copolymer is discharged from said vessel.

12 Claims, 2 Drawing Figures

SLURRY POLYMERIZATION PROCESS

CROSS-REFERENCE TO RELATED APPLICATIONS

This application is a continuation-in-part of application Ser. No. 241,234, filed Apr. 5, 1974, and now abandoned, which is a continuation-in-part of application Ser. No. 873,354, filed Nov. 3, 1969, entitled Polymerization Process, and now abandoned.

BACKGROUND OF THE INVENTION

The cost of manufacturing elastomers in a solution polymerization process is greatly influenced by the cost of isolating the elastomer from the solvent, solvent recovery equipment, and the cost of the solvent used. In addition, practical handling methods dictate that the solution viscosity of the reaction mass be low which in turn limits the polymer concentration obtainable. The unreacted monomers when separated from the polymer during recovery are desirably recycled to the reactor to make the process economical.

It is known that elastomeric polymers can be prepared in a "slurry" process by copolymerizing monomers in a nonsolvent for the polymer such as a halogenated hydrocarbon solvent as disclosed in U.S. Pat. No. 3,291,780, or by copolymerizing the monomers in one or more of the liquid monomers themselves as disclosed in U.S. Pat. Nos. 3,370,052 and 3,358,055. A "slurry" process, particularly one using a liquid monomer reaction medium, has the advantages of requiring a smaller reactor volume throughput per unit of polymer produced than a solution process and a higher reaction rate per unit amount of catalyst. These advantages permit the use of a smaller reactor per unit of polymer produced and mass transfer problems and mixing are minimized because of the lower viscosity of the reaction medium compared to the solution process. In addition, the absence of a solvent eliminates the need for solvent isolation and recycle equipment minimizing the cost for equipment needed for polymer isolation and purification.

Although "slurry" polymerization has many advantages, it does have certain disadvantages. For example, the elastomeric copolymer thus prepared tends to stick to interior reactor walls and surfaces in contact with the reaction medium, thereby fouling the reactor and eventually plugging the connecting lines. Also, the polymer produced usually contains occluded portions of the polymerization medium.

There is a need for a process for carrying out a "slurry" polymerization process for elastomers whereby the elastomer can be removed from the reactor without causing reactor fouling, and the polymer produced is practically free of occluded polymerization medium.

SUMMARY OF THE INVENTION

According to the present invention, there is provided an improvement in a process for the copolymerization of ethylene with
1 an α-olefin having 3 to 18 carbon atoms or
2 an α-olefin having 3 to 18 carbon atoms and a nonconjugated diene having only one readily polymerizable double bond
in the presence of a catalyst and of a liquid, organic polymerization medium to an elastomeric copolymer insoluble in said polymerization medium, having a portion of said polymerization medium occluded therein, and tending to agglomerate on solid surfaces, wherein simultaneously and continuously a. the agglomerated copolymer adhering to the interior surfaces of the polymerization vessel is removed with a wall scraper which is being cleaned by a cleaning member associated therewith;

b. the agglomerated copolymer as removed is collected; and c. the collected, agglomerated copolymer is concurrently sheared and extruded, whereby the occluded liquid polymerization medium is separated from the copolymer and remains in the polymerization vessel, while the copolymer is discharged from said vessel.

DETAILED DESCRIPTION OF THE INVENTION

Figure 1:
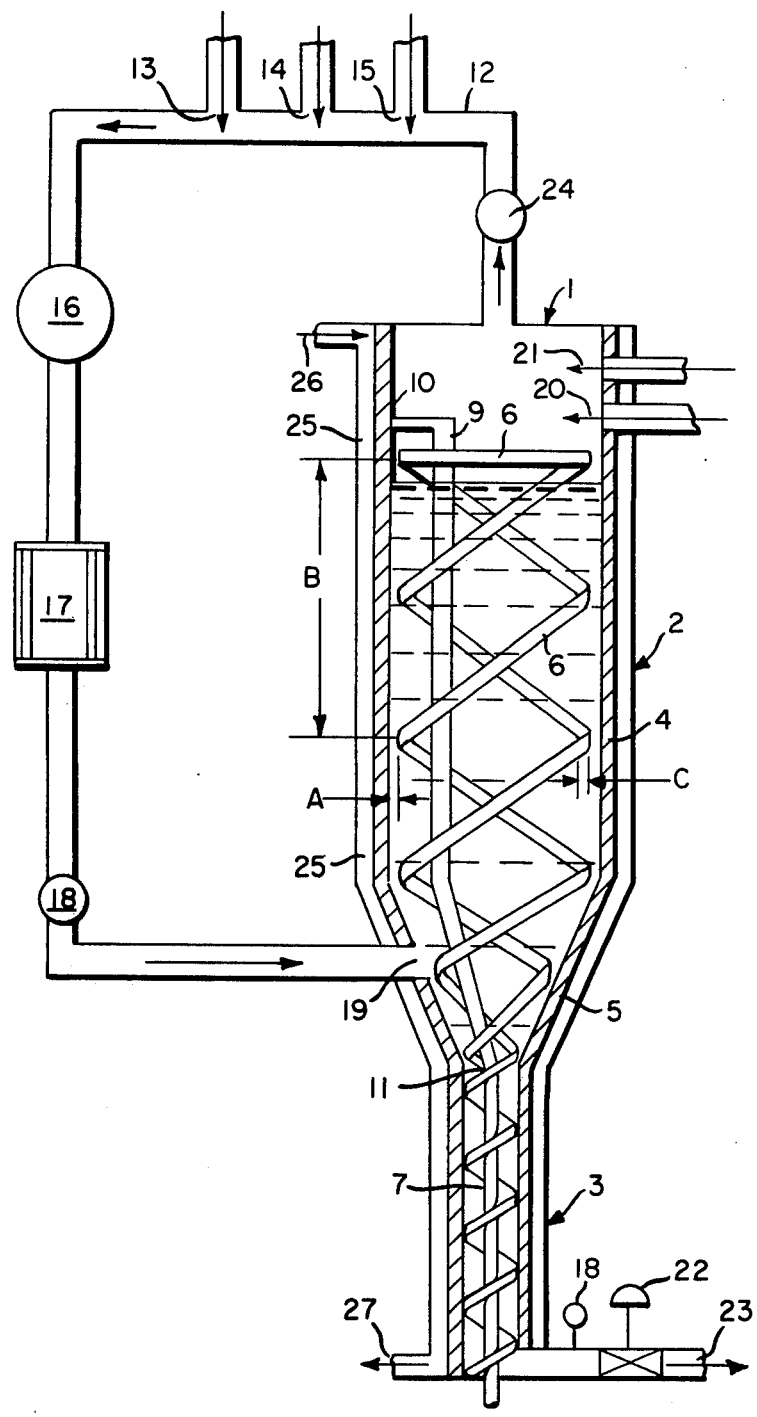
FIG. 1 illustrates a preferred reactor useful in practicing the process of this invention. The reactor houses an open-cage, double-flighted, spiral ribbon to scrape agglomerated polymer from the walls of the reactor in combination with an extruder in the reactor to express occluded polymerization medium from the polymer while removing polymer from the reactor.

The polymerization process of this invention is useful in preparing copolymers wherein the copolymer is a separate phase insoluble in the polymerization medium and adheres to and agglomerates on the interior reactor surfaces exposed to the copolymer.

Copolymers that can be prepared according to this invention include those obtained by copolymerizing ethylene with another α-monoolefin having the structure

where R is a $C_1$–$C_{16}$ alkyl, preferably straight-chained. Representative α-monoolefins are propylene, 1-butene, 1-pentene, 1-hexene, 1-heptene, 1-octene, 1-octadecene, 6-ethyl-1-decene, and 5-methyl-1-hexene.

Other copolymers include sulfur curable α-olefin elastomeric copolymers. By "sulfur curable" it is meant that the copolymer will contain at least 0.1 gram moles of ethylenic carbon-to-carbon double bonds per kilogram. These include the normally solid copolymers of ethylene and at least one nonconjugated diene having only one polymerizable double bond. In order to btain a copolymer with desirable elastomeric properties, it should contain between about 20 to 80 weight percent ethylene units and 80 to 20 weight percent of one or more other α-olefin units.

Useful sulfur curable copolymers include terpolymers of ethylene, another α-monoolefin and a nonconjugated diene having only one polymerizable double bond. Useful α-monoolefins are described above. Particularly preferred are copolymers of ethylene, propylene, and a nonconjugated diene (called EPDM copolymers) because of their outstanding physical properties. The diene can be an open chain or cyclic compound but must have only one readily polymerizable double bond in the sense that only one double bond of the diene reacts readily to a substantial degree in forming the copolymer backbone. The open chain nonconjugated dienes have the general formula:

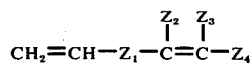

wherein $Z_1$ is a $C_1$-$C_8$ alkylene and $Z_2$, $Z_3$, and $Z_4$ are independently hydrogen or alkyl radicals and the Z groups are selected such that the diene has from about 6–22 carbon atoms and only one terminal double bond.

Useful open chain dienes include 1,4-hexadiene, 1,9-octadecadiene, 6-methyl-1,5-heptadiene, and 15-ethyl-1,15-heptadecadiene.

Useful cyclic nonconjugated dienes include dicyclopentadiene, 5-alkylidene-2-norbornene, e.g., 5-ethylidene-2-norbornene; 5-alkenyl-substituted 2-norbornenes, e.g., 5-(2'-butenyl)-2-norbornene; 2-alkyl-2,5-norbornadienes, e.g., 2-ethyl-2,5-norbornadiene and 1,5-cyclooctadiene.

A preferred EPDM copolymer is ethylene/propylene/1,4-hexadiene.

Representative compolymers made from the above-described α-monoolefins that can be made by the process of this invention are given in U.S. Pat. Nos. 2,933,480; 3,000,866; 3,063,973; 3,093,620; 3,093,621; 3,151,173; and 3,260,708.

The polymer is conveniently formed by carrying out the polymerization in the liquid monomers to be polymerized. Since the liquid part of the medium can contain liquids other than the liquid monomers, it will be referred to, for convenience, as "liquid organic polymerization medium." The catalyst used can be a conventionally known catalyst. Ziegler-type catalysts have been found useful.

The copolymer forms as a separate phase containing occluded liquid organic polymerization medium and is swollen with dissolved medium. When the polymer phase is formed it adheres to the equipment surfaces exposed to the polymer, coalesces and forms an agglomerated mass. The agglomerated polymer is scraped from the equipment surfaces, collected by pumping it to a common location in the reactor and extruded from the reactor.

The occluded portion is removed or expressed by the mechanical action of kneading or shearing the polymer while still in the reactor and extruder. Pressure increases as the polymer is conveyed through the extruder from reactor pressure to a discharge gauge pressure which is generally above 50 kg./cm.$^2$ and preferably between 50 and 150 kg./cm.$^2$. Pressure differentials so formed cause occluded liquids, as they are freed, to move opposite to the direction of extrusion and return to the reactor. The dissolved portion can be vaporized from the polymer as the polymer leaves the reactor or is removed by other conventional means at some later time.

An apparatus for carrying out the process of this invention is described below and is illustrated in the drawings.

Referring to FIG. 1, the apparatus consists essentially of a generally cylindrical, vertically aligned vessel 1, with a circular cross section having a polymerization section 2 and a polymer collecting section 3 in communication with each other. Polymerization section 2 is made of a cylindrical section 4 and a truncated cone section 5 and houses an open-cage, double-flighted spiral ribbon 6. The polymer collecting section houses an extruder 7. Alternatively, reactor 1 can be horizontally aligned or canted and the spiral ribbon can be single or multipleflighted.

The spiral ribbon is rotatably mounted and has an outside diameter slightly smaller than the inside diameter of vessel 1 so that it almost scrapes the walls of the polymerization region 2 as it rotates. It is desirable to maintain a sufficient clearance between the spiral ribbon 6 and vessel 1 to avoid mechanically binding the spiral ribbon. The amount of clearance A can vary according to the type polymer being prepared and the amount of polymer build-up permissible for continuous operation. In preparing an ethylene/propylene/1,4-hexadiene (58/36/6) polymer in a reactor having an inside diameter of 8.9 cm. the spiral ribbon desirably has a clearance of about 0.32 cm. from the inside wall of vessel 1. The pitch B of the spiral ribbon can be from ½ to 3 ribbon diameters and preferably is ¾ to 1½ diameters for optimum effectiveness. The pitch B is the longitudinal spacing of corresponding points on adjacent flights and in the case of multiple flights, the pitch is equal to the longitudinal spacing multiplied by the number of flights. The dimension of the spiral ribbon in the radial direction C should be no greater than ¼ of the largest inside diameter of vessel 1. The lower end of the spiral ribbon conforms to the conical section of the polymerization chamber.

In operation, spiral ribbon 6 simultaneously removes any material adhering to the walls of vessel 1 and moves it to extruder 7 which for practical reasons has a diameter of less than ½ that of vessel 1, and a flight pitch of about ½ to 2 extruder diameters. The spiral ribbon and extruder can be joined to rotate at the same speeds or arranged so that they rotate at different speeds.

The cleaning member is a stationary rod 9 which is placed inside the cage of the spiral ribbon and is positioned to remove polymer from the inside periphery of the spiral ribbon. It is desirable to maintain a clearance between rod 9 and the spiral ribbon 6 to avoid mechanically binding the moving parts. A clearance of up to about 4% of the diameter of vessel 1 has been found useful.

Rod 9 is attached at one end to the inside wall of vessel 1 at point 10 and at the other end can be free or, if desired, attached to the extruder at point 11 by a bearing (not shown) which permits the extruder to rotate but holds the rod stationary.

Rod 9 can have a cross section of any desired configuration, e.g., rectangular, square, elliptical, triangular, or circular, and any one particular cross section can be used with varying thicknesses along the length of the rod for added strength. If during use, material build-up on the rod becomes excessive, the portion of the rod in the conical section can be eliminated or the monomer mixing region and the polymer collecting region can be made having the same size cross section, thereby eliminating the truncated conical section and the rod can be rotated on its axis. Preferably, rod 9 is rotated counter to and at twice the speed of ribbon 6 rotation.

Figure 2:
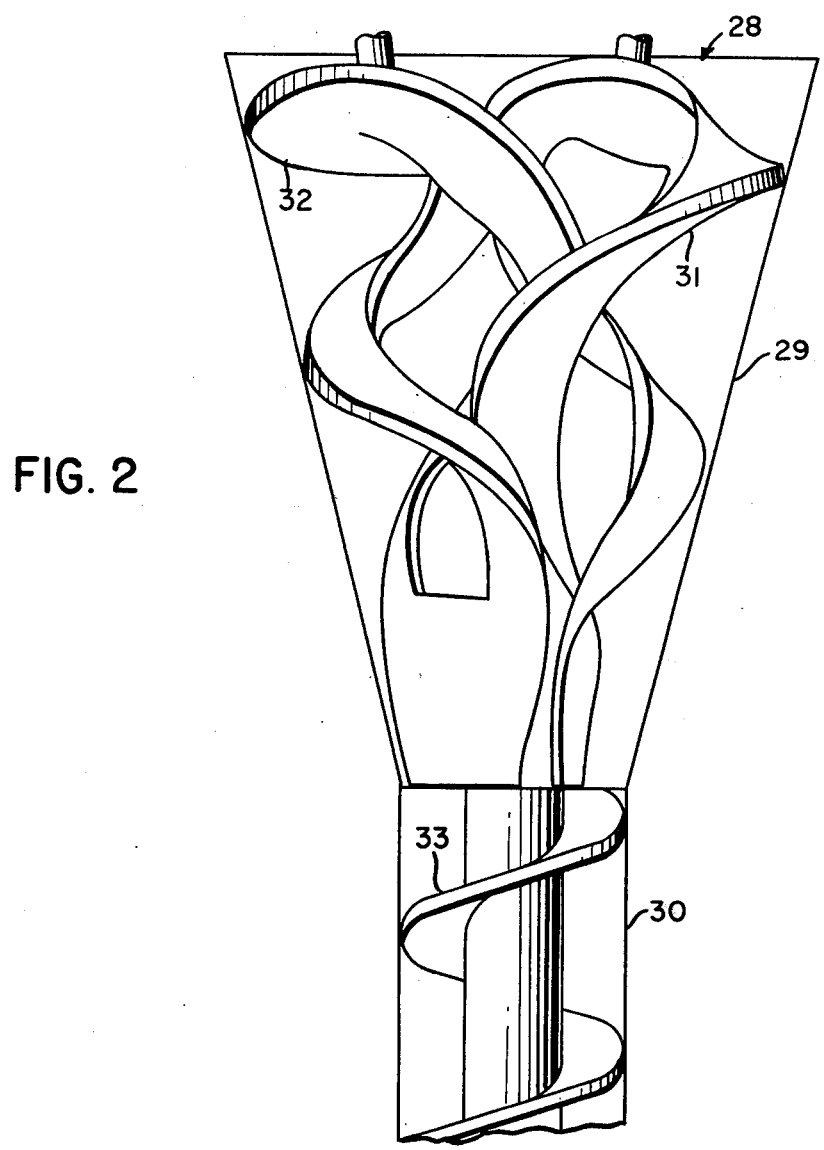
FIG. 2 is an alternate embodiment of the reactor showing two spiral helices intermeshed and converging on an extruder thereby adapted to scrape agglomerated polymer from the interior walls of the reactor and then deliver it to the extruder which shears and extrudes it, thus removing occluded polymerization medium from the polymer while extruding the liquid-free polymer from the reactor. Each helix in this embodiment serves at the same time as the wall scraper and the cleaning member.

An alternative reactor which can be used to carry out the process of this invention is shown in FIG. 2. It comprises a reactor 28 having a polymerization region 29 in the shape of double intersecting cones and a polymer collecting region 30, two spiral ribbons 31 and 32 positioned side by side and intermeshed so that they scrape the inside surface of each other and the walls of the polymerization chamber as they rotate, and an extruder 33 in the polymer collecting chamber.

This invention provides the advantage of being able to carry out a continuous "slurry" process without fouling the reactor, resulting in the production of polymer free, for all practical purposes, from occluded or separate phase residual liquids and monomers.

The process of this invention is illustrated by the following examples. All parts, percentages, and proportions are by weight unless otherwise indicated.

EXAMPLE 1

The apparatus used to carry out this example is shown in FIG. 1. Cylindrical portion 4 or reactor 1 has an inside diameter of 8.89 cm. and a length of 27.9 cm. Truncated conical section 5 which serves as a transition between the cylindrical portion 4 and the polymer collecting section 3 is 3,81 cm. in height with an outside diameter of 8.81 cm. at one end to match the connecting portion of the polymer collection section 3.

The spiral ribbon contained within the polymerization section 2 has an outside diameter of 8.25 cm. in the cylindrical section of the polymerization region and spirals in the conical section maintaining a clearance of 0.32 cm. It is double-flighted having a pitch of 17.8 cm. Within the spiral ribbon is stationary rod 9 made of steel and positioned to scrape the inside portion of the spiral ribbon as the ribbon rotates. The polymer collecting region is 41.61 cm. long housing an extruder with a varying diameter, pitch, and flight depth.

The extruder is made up of four sections. Details of the sections are not shown. The first section is cylindrical having an outside diameter of 3.81 cm. to match the small diameter of the truncated conical section and a length of 12.4 cm. with flights of 1.11 cm. deep, pitched at 3.2 cm. The second section is a transitional section having an outside diameter of 3.81 cm. to match the first section then tapering to a diameter of 2.54 cm. This transitional section has a length of 6.35 cm. with a flight depth ranging from 1.11 cm. to 0.95 cm., and a pitch varying from 3.2 cm. to 2.54 cm., respectively. The third section is cylindrical having an outside diameter of 2.54 cm. and a length of 10.98 cm. The flight depth is 0.95 cm. with a pitch of 2.54 cm. The fourth section is 11.88 cm. long, having an outside diameter of 2.54 cm., and a flight depth of 0.35 cm. pitched at 2.54 cm. The transition in flight depth between the third and fourth sections is gradual.

The ingredients are fed to reactor 1 in the following manner: ethylene, propylene, and hydrogen gases are fed to conduit 12 through rotometers (not shown) and directed to the inlet of compressor 16. The average flow rates are as follows: through port 13 passes ethylene at 88.5 grams per hour; through port 14 passes propylene at 437 grams per hour; and through port 15 passes ethylene plus 1.73 volume percent hydrogen at 68 grams per hour. These gases are then compressed in compressor 16 to a gauge pressure of 35.1 kg./cm.$^2$ and the condensed in water-cooled condenser 17 at a temperature of 25° C. and fed to the conical section of the reactor through pressure regulating valve 18. A third monomer and catalyst are added to the reactor as a liquid. One stream if fed to the reactor through port 20 and a 0.0171 mole per liter solution of vanadium tris-(acetylacetonate) in 1,4-hexadiene and another stream is fed through port 21 as a 0.639 mole per liter solution of diisobutylaluminum chloride in 1,4-hexadiene. These solutions are fed at a rate of 50 milliliters per hour and 23.5 milliliters per hour, respectively.

The amount of liquid in reactor 1 is maintained at about 1.0 liter. The liquid level is measured with a gamma radiation source and detector (not shown) and manually controlled to maintain proper volume in the reactor. The liquid monomer temperature in reactor 1 is maintained at 45° C.

Reactor 1 is surrounded by a water jacket 25 having inlet port 26 and exit port 27. The water in the jacket is maintained at approximately 50° C. The water jacket serves to prevent heat loss from the reactor by conduction through the reactor wall due to the large surface to volume ratio of this small scale reactor. The polymerization process is exothermal, and the liquid monomer temperature is maintained at 45° C. by evaporative cooling. The heat of reaction is removed by allowing the reaction liquid to boil. The vapor produced passes through temperature control valve 24 and into conduit 12 to be recycled with fresh monomer.

The copolymer forms as a separate phase which adheres to the reactor and processing equipment and agglomerates into a mass. As the spiral ribbon turns, it scrapes the polymer from the sides of the reactor, and the stationary bar 9 scrapes the polymer from the inside surface of the spiral ribbon permitting the helix to pump the polymer to the polymer collection section 3. Extruder 7 in the polymer collecting chamber pumps the polymer to pressures in excess of 50 kg./cm.$^2$ for discharge into line 23. The pressure generated by extruder 7 is indicated on pressure gauge 18, and pressure control valve 22 is adjusted to obtain desired extrusion pressure between 50 and 150 kg./cm.$^2$. The spiral ribbon and extruder are operated at 20 rpm.

Extruder 7 shears the copolymer as it pumps the copolymer from the reactor. Occluded liquid is freed from the copolymer during shearing of the polymer by spiral ribbon 6 and the extruder. The freed liquid, including unreacted monomer, migrates upward, against the direction of polymer travel and returns to the polymerization region 2. Dissolved monomer in the polymer is vaporized as the polymer moves from the high pressure area in the extruder output through pressure control valve 22.

The copolymerization process is continuous for a period of 29 hours with the production rate of copolymer of about 56 grams per hour. The reaction is maintained at a temperature of 45° C. with a pressure of about 21.1 kg./cm.$^2$ gauge in the vapor space of reactor 1. A typical analysis of the vapor in the reactor is 0.8% nitrogen, 0.2% hydrogen, 31% ethylene, and 68% propylene. Excess monomers are removed from the reactor through a port (not shown) on the side of the reactor vessel to control the liquid level of the reactor so that the level of the liquid never exceeds the height of the spiral ribbon.

Analysis of the copolymer discharged from the extruder, but prior to flashing, shows that it contains approximately 0.40 gram of dissolved residual liquid monomers per gram of dry polymer produced. An independent test run under the reactor conditions of this example shows that the solubility of the liquid monomers in the polymer is 0.40 gram of monomers per gram of dry polymer. Therefore, the presence of 0.40 gram of residual liquid monomers shows that all entrained or occluded monomers are expressed or removed from the polymer, in the reactor, before it is discharged from the extruder. The monomers are flashed off and analysis shows that the copolymer average composition is 58.3 weight percent ethylene, 36.2 weight percent propylene, and 5.41 weight percent 1,4-hexadiene, and has a Wallace Plasticity of 45.

EXAMPLE 2

Example 2 is carried out according to the procedure of Example 1 except for the following changes: the monomer feed rate to reactor 1 is ethylene, 118 grams per hour through port 13; propylene, 407 grams per hour through port 14; and ethylene containing 4.38 volume percent hydrogen, 3.2 grams per hour through port 15. These monomers are fed to the compressor 16 and compressed to 35.1 kg./cm.$^2$ and fed to condenser 17 where they are condensed at a temperature of 25° C., then passed through valve 18 and into the concial section of reactor 1. The third monomer and catalyst are fed to reactor 1 in the following manner: port 20 carries 24.8 milliliters per hour of 1,4-hexadiene containing 0.00372 mole per liter of vanadium trisacetylacetonate and 0.0703 mole per liter of benzotrichloride, and port 21 carries a stream of 20 milliliters per hour of 1,4-hexadiene containing 0.191 mole per liter of triethyl aluminum and 0.0386 mole per liter of diethyl aluminum chloride. The copolymerization process is continuously run for 49 hours at 45° C. with an average production rate of 66 grams per hour copolymer.

Analysis of the copolymer discharged from the extruder, but prior to flashing, shows that it contains approximately 0.40 gram of dissolved residual liquid monomers per gram of dry polymer produced. An independent test run under the reactor conditions of this example show that the solubility of the liquid monomers in the polymer is 0.40 gram of monomers per gram of dry polymer. Therefore, the presence of 0.40 gram of residual liquid monomers shows that all entrained or occluded monomers are expressed or removed from the polymer, in the reactor, before it is discharged from the extruder. The monomers are flashed off and analysis shows that the copolymer average composition is is 55.9 weight percent ethylene, 41 weight percent propylene, and 3.1 weight percent 1,4-hexadiene, and the copolymer has a Wallace Plasticity of 32.

We claim:

1. In a process for the copolymerization in a polymerization vessel of ethylene with
   1 an α-olefin having 3 to 18 carbon atoms or
   2 an α-olefin having 3 to 18 carbon atoms and a nonconjugated diene having only one readily polymerizable double bond
   in the presence of a catalyst and of a liquid, organic polymerization medium to an elastomeric polymer insoluble in said polymerization medium, having a portion of said polymerization medium occluded therein, and tending to agglomerate on solid surfaces,
   an improvement of simultaneously and continuously
   a removing the agglomerated copolymer adhering to the interior surfaces of the polymerization vessel with an open-cage, double-flighted spiral ribbon and a rod placed inside the cage and positioned to remove the polymer from the inside periphery of said spiral ribbon; or with two intermeshed spiral helices, each, in addition to removing agglomerated polymer from the surfaces of the vessel, also removing polymer from each other;
   b collecting the agglomerated copolymer as removed; and
   c concurrently shearing and extruding the collected, agglomerated copolymer, whereby the occluded liquid polymerization medium is separated from the copolymer and remains in the polymerization vessel, while the copolymer is discharged from said vessel.

2. The process of claim 1 wherein the elastomeric copolymer is a copolymer of ethylene with an α-monoolefin having up to 18 carbon atoms.

3. The process of claim 1 wherein the elastomeric copolymer is a copolymer of ethylene with an α-monoolefin having up to 18 carbon atoms and a nonconjugated diene having only one copolymerizable double bond.

4. The process of claim 3 wherein the copolymer is a copolymer of ethylene, propylene, and 1,4-hexadiene.

5. The process of claim 1 wherein the rod rotates about its longitudinal axis.

6. The process of claim 1 wherein the copolymer is discharged from the vessel by means of an extruder placed in the bottom portion of the vessel.

7. The process of claim 6 wherein the copolymer is subjected to increasing shearing and extruding pressures in the extruder.

8. The process of claim 7 wherein the shearing and extruding pressures increase from the normal polymerization vessel pressure to a discharge gauge pressure above 50 kg./cm.$^2$.

9. The process of claim 8 wherein discharge gauge pressure is up to about 150 kg./cm.$^2$.

10. The process of claim 1 wherein the copolymerization catalyst consists essentially of vanadium tris(acetylacetonate) and diisobutylaluminum chloride.

11. The process of claim 1 wherein the copolymerization catalyst consists essentially of vanadium tris(acetylacetonate), benzotrichloride, triethylaluminum, and diethylaluminum chloride.

12. The process of claim 1 which is a continuous process.

* * * * *